United States Patent [19]

Hart et al.

[11] 4,275,088
[45] Jun. 23, 1981

[54] DRY MIX FOR LAYER CAKE CONTAINING CITRUS JUICE VESICLE SOLIDS

[75] Inventors: Patricia E. Hart, St. Paul; Tisha Nichols, Osseo, both of Minn.

[73] Assignee: General Mills, Inc., Minneapolis, Minn.

[21] Appl. No.: 9,995

[22] Filed: Feb. 7, 1979

[51] Int. Cl.³ .............................................. A21D 10/04
[52] U.S. Cl. .................................... 426/554; 426/549; 426/653; 426/616
[58] Field of Search ............... 426/496, 549, 555, 554, 426/553, 804, 658, 653, 616

[56] References Cited

U.S. PATENT DOCUMENTS

| | | | |
|---|---|---|---|
| 2,865,757 | 12/1958 | Aurell | 426/558 |
| 2,952,548 | 9/1960 | Work | 426/804 |
| 3,071,472 | 1/1963 | Hager et al. | 426/554 |
| 3,112,202 | 11/1963 | Wadsworth | 426/658 |
| 3,190,756 | 6/1965 | Aurell | 424/35 |
| 3,196,020 | 7/1965 | Work | 426/302 |
| 3,268,337 | 8/1966 | Howard et al. | 426/330 |
| 3,346,389 | 10/1967 | Evans et al. | 426/554 |
| 3,516,836 | 6/1970 | Shea | 426/554 |

OTHER PUBLICATIONS

J. W. Kesterson and R. J. Braddock, 'Processing and Potential Uses for Dried Juice Sacs' *Food Technology*, Feb. 1973, pp. 52-54.

*Primary Examiner*—Joseph M. Golian
*Assistant Examiner*—Elizabeth J. Curtin
*Attorney, Agent, or Firm*—John A. O'Toole; Gene O. Enockson

[57] ABSTRACT

Disclosed are dry cake mixes which produce improved layer cakes. The cake mixes contain flour, sugar, emulsified shortening, leavening agents, and from about 0.2% to 10% by weight of dried citrus juice vesicle solids. The juice vesicle solids have a moisture content between about 5% to 12% and a particle size of from about 50 to 400 microns.

10 Claims, No Drawings

DRY MIX FOR LAYER CAKE CONTAINING CITRUS JUICE VESICLE SOLIDS

BACKGROUND OF THE INVENTION

1. Field of the Art

This invention relates to improved dry cake mixes which produce improved layer cakes. More particularly, the present invention relates to the addition of defined forms of citrus juice vesicle solids to such mixes in small but effective quantities to materially improve important characteristics of the finished baked cakes obtained from such mixes.

2. The Prior Art

The use of prepared mixes for baking cakes has received wide usage, particularly in home baking. So-called "dry" prepared mixes for layer cakes are made by combining sugar, flour, shortening, leavening and other ingredients including perhaps milk solids, egg solids, flavoring and coloring to form a free-flowing granular mixture. To prepare cake batters from these dry mixes for baking, liquid materials such as water, liquid shortening, milk and eggs are added and the combination is then beaten both to form a homogeneous mixture and to incorporate air. The resulting batter is then baked to obtain finished cakes.

Cakes can vary markedly in many respects, including such physical properties as density, grain size and grain size distribution, cell wall thickness, center to edge ratios, total moisture, moisture activity, crumb softness, moisture retentivity, etc. Cakes can also differ markedly in such organoleptic properties as texture, mouth feel, gumminess and off-tastes. Alteration of the dry mix formulation to realize cakes differing in any one attribute generally yield concomitant changes, often detrimental, in several other attributes. Thus, dry mix formulations typically must balance increases in a desired cake attribute against undesirable changes in others.

Traditionally, consumers preferred dry mixes which produced cakes having a fine, uniform, thin-walled grain structure and having fine crumbs. The air cells have been small, numerous and generally evenly distributed throughout the interior of the cake. Such cakes are prepared from high sugar to flour ratio cake mixes formulated with low protein or "cake" flour and with emulsified shortening. However, consumer taste fashion presently favors higher moistness-impression cakes characteristic of "from scratch" cakes. Such cakes are characterized by higher moisture levels and crumb softness.

Scratch cakes are typically prepared from "all-purpose" flour which has a higher protein level than cake flour. While scratch layer cakes may be superior in desired moistness, they are typically inferior in cake texture. Such cakes are muffin-like in texture and have non-uniform, widely-varying cell sizes, etc. Past efforts at realizing enhanced moistness, traditional texture layer cakes have included formulating dry mixes from cake flour and containing pre-gelatinized starch. Dry mixes having high gum levels have also been taught.

In spite of the above prior art attempts, formulation of enhanced moistness layer cake dry mixes is not accomplished without certain difficulties. Cakes prepared from mixes containing pre-gelatinized starch, gums, etc. while exhibiting enhanced moistness tend to exhibit decreased specific volumes, i.e., the volume of baked cake per unit weight of dry prepared mix, e.g., cc./g. Further, such cakes exhibit poor moisture retentivity and poor grain structure. Also, such cakes tend to exhibit such organoleptically undesirable attributes as gumminess.

Given the state of cake mix art as described, there is a continuing need for new layer cake dry mixes to prepare cakes which provide both enhanced moistness impressions of "from scratch" cakes and the texture of traditional layer cakes. Accordingly, it is an object of the present invention to provide layer cake dry mixes which provide finished cakes of both enhanced moistness and traditional, fine grain internal structure.

It is a further object of the present invention to provide enhanced moistness cake mixes having high specific volumes and which are free of organoleptically undesirable gumminess.

It has been surprisingly discovered that the above objectives can be realized and superior layer cake dry mixes and finished cakes baked therefrom can be provided by formulating dry mixes containing certain amounts of dried citrus juice vesicle solids.

Citrus juice vesicles are a by-product of commercial juice manufacture from the citrus fruit. After removal of larger materials such as peel and seeds, the citrus juice is screened to remove the pulp. A variety of terms have been loosely used to refer to this pulp material or parts thereof in its various physical or processed forms. It has been called at various times in its treated state, "juice vesicles", "juice sacs" or "finisher pulp". The juice vessicles are the membranes forming the juice sacs. During juicing operations, the juice sacs rupture and release their juice. Thus, for purposes of the present invention, "juice vesicles" is used synonymously for the residual juice sac material remaining after the release of the juice from the juice sac.

Juice sac material which has been drum dried, spray dried or solvent dried has been suggested for use as a food additive. Such suggested utilization is based upon the excellent water-binding and good oil-binding properties of the material. One reference (see "Processing and Potential Uses for Dried Juice Sacs", by J. W. Kesterson and R. J. Braddock, *Food Technology*, February 1973, pp. 52-54) suggests its utilization in a wide variety of food products but has no specific teachings of actual use.

However, notwithstanding such optimistic speculation concerning potential usage, difficulties have arisen in the practical efforts to utilize the juice vesicle material or "protopectin" material derived therefrom even in additive amounts. Several art efforts have been made at incorporating small amounts into breads or cakes of treated protopectin derived from citrus residue including from dried juice vesicles (see U.S. Pat. No. 2,952,548 issued Sept. 13, 1960 to L. T. Work; U.S. Pat. No. 3,190,756 issued June 22, 1965 to W. Aurell; and U.S. Pat. No. 3,196,020 issued July 20, 1965 to L. T. Work). These patents disclose elaborately treating the protopectin with various lipids or colloid materials to decrease the rate or amount of hydration of the protopectins. Without such treatment, the patents teach that the rapid hydration of these extremely hydrophilic materials causes doughs or batters to set quickly into non-elastic solids which are unsuitable for bread or cake production. Alternatively, it has been taught that cakes containing small amounts of untreated protopectin can be realized by formulating doughs to low gluten flours such as potato flour. (See, for example, U.S. Pat. No. 2,865,757 issued Dec. 23, 1958 to W. Aurell.)

Accordingly, it has been surprisingly discovered that a particular citrus fruit residue, juice vesicles, can be incorporated into cake mixes using conventional flour without need for elaborate treatment with various coatings to be applied to the citrus fruit residue.

SUMMARY OF THE INVENTION

The present invention relates to improved dry cake mixes which produce improved finished layer cakes. The finished layer cakes exhibit enhanced moistness initially and for several days thereafter compared to conventional finished layer cakes prepared from dry mixes containing various hydrophilic colloids. The present dry mixes comprise from about 35% to 45% by weight of the dry mix of wheat flour, from about 40% to 54% by weight of sugar. The sugar to flour ratio in the dry mix ranges from about 1.20 to 1.35. The present dry cake mixes additionally comprise from about 1% to 16% by weight of an emulsified shortening and from about 0.5% to 4% of a chemical leavening agent. The present dry mixes also comprise from about 0.2% to 10% by weight of processed juice vesicle solids. The processed juice vesicle solids have (1) a moisture content of from about 5% to 12% by weight of said processed juice vesicle solids, and (2) particle size of from about 50 to 400 microns.

DETAILED DESCRIPTION OF THE INVENTION

The improved dry mixes for layer cakes of the present invention produce cakes which exhibit enhanced moistness as well as superior texture and grain structure, essentially comprise wheat flour, sugar, emulsified shortening, chemical leavening agents, and processed juice vesicle solids. Each of these ingredients as well as optional components and dry mix composition preparation and use are discussed in detail as follows:

Throughout the specification and claims, percentages and ratios are by weight and temperatures are in degrees Fahrenheit, unless otherwise indicated.

A. Flour

The present dry mix compositions essentially contain from about 35% to 45% of the dry mix of wheat flour. Better results are achieved when the flour level ranges from about 36% to 39% by weight of the dry mix. The flour useful in the dry mixes of the present invention can be of conventional type and quality. Thus, the flour which is useful in the practice of this invention is wheat flour having a protein level of from about 8% to 10% of the flour. Traditional cake flour has about 8% protein by weight of the flour. Pastry flour ordinarily has a protein level of about 10% by weight of the flour. Other flours such as bread flour generally have protein levels about 10% by weight. The preferred protein range for the wheat flour useful in this invention is between about 9% to 10% by weight of the flour. This protein range permits easy removal of the cake from the pan. A good general all-purpose flour also can be used. Such all-purpose flour generally comprises a mixture of both hard and soft wheat flours, i.e., both high protein level and low protein level flours. Such flours are useful if the average protein content ranges from about 8% to 10% by weight.

B. Sugar

The dry mix compositions of the present invention also comprise from about 40% to 54% sugar. Typically, sucrose is used in cake mixes as the sugar ingredient although up to about 15% of the sugar in the present dry mix can be supplied by dextrose. Commercially available sugar usually contains up to about 4% starch as an aid to maintaining its free-flowing properties. Preferably, the sugar is included in the mix in amounts of from about 45% to 50% by weight of the mix.

The baker's ratio is the weight ratio of sugar to flour. High ratio cakes have long been preferred for texture and keeping quality. The present cake mixes essentially have a weight ratio of sugar to flour about 1.20 to 1.35. Better results are achieved when the sugar to flour ratio in the present mixes ranges from about 1.27 to 1.34.

In a preferred embodiment, a substantial portion of the sugar ingredient is finely ground. Finely ground sugars aid the pourability of the present dry mixes, particularly when plastic shortening is used at high levels. Better results are achieved when at least 50% by weight of the sugar component has an average particle size of 50 microns or below. The remainder of the sugar component can be supplied by conventional granulated sugar.

C. Shortening Component

The instant dry mix compositions also essentially comprise from about 6% to 16% of an emulsified shortening ingredient. Preferably, the present dry mix compositions comprise from about 8% to about 13% of the shortening ingredient. Best results are obtained when the shortening component comprises from about 9% to 11% of the present dry mix compositions. Maintenance of shortening concentrations within these limits is essential for the realization of dry mixes in the form of free-flowing particles. Such concentrations are also important in providing cakes of acceptable textural quality.

Conventional shortening materials are suitable for use as the shortening ingredient of the present dry mixes. Such conventional shortening materials are well known in the cake mix preparation art. The conventional shortening useful herein are fatty glyceridic materials which can be classified on the basis of their physical state at room temperature. Liquid shortenings can be used in the present dry mix compositions and provide the advantage of ease of incorporation into dry mixes. Solid shortening can also be used and provide the advantage of desirable mouthfeel upon cake consumption. More commonly, and preferred for use herein, mixtures of liquid and solid shortenings are used in dry mixes. Such mixes can be fluid or plastic depending in part upon the level of solid fatty materials. Shortenings of this type comprise a liquid oil containing from about 2% to 26% normally solid fatty glycerides. That is, a solids content index ("SCI") at 70° and 4% to 6% at 100° F.

The solid fatty glycerides can include fatty monoglycerides and diglycerides of saturated fatty acids having 16 to 22 carbon atoms. The liquid shortening can be animal, vegetable or synthetic oil which is liquid at ordinary room temperatures. Representative of such liquid shortenings are coconut oil, palm kernel oil, cottonseed oil, peanut oil, olive oil, sunflower seed oil, sesame seed oil, corn oil, safflower oil, poppy seed oil, soybean oil, rape seed oil, babassue oil and the like. Other suitable shortening materials and methods of shortening preparation as described in detail in Bailey, "Industrial Oil and Fat Products", (3rd ed. 1964) which is incorporated herein by reference.

Conventionally, the shortening ingredient of cake mixes is emulsified. That is, the shortenings provide a convenient carrier for addition of emulsifiers to the dry mix. Such emulsifiers aid the realization of cakes with improved grain structure and cake texture. The emulsifier typically comprises from about 1% to 16% of the shortening component, preferably from about 5% to about 15% and, most preferably from about 10% to 15%.

The exact amount of emulsifier used is determined by the particular emulsifier employed and specific desired finished cake attributes. The art is replete with emulsifiers which are suitable for inclusion in the shortening component for the provision of cake mixes for layer cakes. Thus, selection of particular emulsifiers will pose no problems for the skilled artisan.

Partially esterified polyhydric compounds having surface active properties are exceptionally suitable for use herein. This class of emulsifiers includes among others, mono- and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulfuric acid esters, such as dodecyl glyceryl ether sulfate and monostearin phosphate. Other examples include the partial esters of hydroxy carboxylic acids, such as lactic, citric, and tartaric acids with polyhydric compounds, for example, glyceryl lactopalmitate, and the polyoxethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful.

D. Juice Vesicle Solids

Citrus juice vesicle solids are an essential ingredient of the present dry mixes. It has been surprisingly discovered that the juice vesicle solids can be incorporated into high ratio cake mixes to provide superior cakes. More surprisingly, it has been discovered that cakes prepared from dry mixes containing vesicle solids exhibit both enhanced moistness, higher specific volumes and superior grain texture. Moreover, compared to cakes prepared from dry mixes containing pre-gelatinized starch, gums, etc., the grain structure of the cakes prepared from the present dry mixes are characterized by smaller, more uniform cell size, both horizontally and vertically, and by thin walls. Most surprisingly, these advantages can be provided without concommitantly producing a finished cake having an undesirably gummy taste characteristic of high gum or other hydrophilic colloid level utilization.

The juice vesicle solids are present in amounts of from about 0.2% to 10% in the present food products. Superior results in terms of moisture impression, moisture retention, high specific volume and grain structure improvement are realized when the juice vesicle solids are present at from about 0.5% to 5.0%. Best results are achieved when the juice vesicle solids concentration ranges from about 1.0% to 2.0%.

When excessively high levels of vesicle solids are added to the dry mixes, batters prepared therefrom using conventional levels of liquid additives have such high viscosities that they do not flow, but rather set to form a gel. Cakes prepared from such batters are not consumer acceptable from either a textural standpoint or from a moistness standpoint. The high batter viscosity can be reduced by addition of higher levels of liquid additives compared to conventional levels. However, cakes prepared from such batters containing additional liquids are not acceptable. The additional liquids are bound by the vesicle solid material. The additional water which is bound by the vesicle solids material is unable to escape during the baking cycle. Thus, the resultant cakes then have a substantial interior region from which the excess water was unable to escape. This interior region is characterized by a dough-like consistency. Extended baking times sufficiently long to allow escape of the extra, bound water unfortunately result in substantial degradation of the other cake regions.

The juice vesicle solids useful herein are essentially characterized by moisture contents of between about 5% to 12% by weight, preferably between about 6% to 8.5% by weight. Best results are achieved when the moisture content of the juice vesicle solids is 7% by weight. When juice vesicle moisture contents are too high, dry mixes containing the vesicle solids can become subject to microbial attack or can exhibit interaction with other dry mix ingredients upon extended storage. It has also been discovered that conventional food art moisture reduction methods, when used to reduce the moisture contents of juice vesicle solids beyond the essential moisture content ranges typically cause undesirable and irreversible degradation in the functionality of the vesicle solids material.

Juice vesicle solids of essential moisture contents are prepared by processing raw juice vesicles by conventional methods to reduce their moisture content. Raw juice vesicles typically contain about 90% to 95% moisture. Thermal drying for example can be used to reduce this high moisture content to the essential range for the vesicle solids employed herein. Such drying can be accomplished by foam mat drying, freeze drying, spray drying and drum drying.

Preferably, the juice vesicle solids are prepared by drum drying raw juice vesicles. Drum drying is an established method for drying a variety of food product material and is recognized as both an economical and continuous method of dehydration. The raw citrus juice vesicle material is spread into a rotating single or double roll of a drum dryer in a thin, uniform layer. After a partial revolution, a scraper knife removes the dried juice vesicle solid material from the drum. The rotating dryer can be either steam or gas heated to provide a roll surface temperature ranging between 300° to 350° F. Required steam pressures needed to provide such roll temperatures range between 80 to 100 p.s.i.g. The roll speed of the drier depends on the temperature, the feed rate of the raw juice vesicle material and the static gap setting of the rolls. The static gap is set at approximately 0.002-0.005 inches (i.e., 1-5 mills). The feed rate is controlled by a moocher, which is a movable rake which oscilates between the rolls at the nip formed by the rolls. This insures a uniform surface application of the raw juice vesicle material on the roller surfaces. When removed from the drum drier, the dried juice vesicle solid material has a final moisture content of approximately 6-12%. The sheeted dried juice vesicle material is then conveyed to a grinder or other size reduction apparatus.

The vesicle solids useful herein are also essentially characterized by their particle size. Vesicle solids useful herein have a particle size distribution such that at least 90% by weight of the vesicle solids have a particle size of less than 400 microns (i.e., through U.S. Standard Sieve No. 40). Preferred vesicle solids have particle sizes such that at least 90% by weight of the vesicle solids have a particle size less than about 200 microns. Maintenance of vesicle solid particle size within these limits is essential for the realization of finished cakes having acceptable visual and textural attributes. While not wishing to be bound by any theory, it is also believed that maintenance of the vesicle solids' particle size within the above-given essential range enables the provision of cake batters which are not rendered unusable due to the too rapid hydration of the hydrophilic vesicle solid material.

Vesicle solids of the essential particle size distribution are prepared using conventional methods and apparatus of the dry culinary mix art for flour milling. The vesicle material is first dried to its final moisture content such as by drum drying as described above. The dried vesicle solid material forms paper-like sheets approximately 2-10 mil in thickness upon removal from the drum dryer. The sheets are broken into rough fragments and are fed to a grinder where the material is comminuted. Thereafter, the material can be milled like wheat flour in conventional milling apparatus such as pin type mills, e.g., alpine pin mills. Alpine pin mills consist of a row of pins on a rotor with stator pins between the circular rows on the rotor disc or the stator pins can be on rotors operating in opposite directions. After milling, the juice vesicle solid material goes through a conventional sizing operation so as to insure that the material has a particle size distribution as described above.

E. Chemical Leavening Agent

Another essential ingredient of the present dry mixes is a conventional chemical leavening agent. The chemical leavening comprises from about 0.5% to 4% of the present dry mixes, preferably from about 1.0% to 3.0% of the dry mixes.

The selection of a suitable chemical leavening or system from those known in the art will pose no problem for one skilled in the formulation of culinary dry mixes for layer cakes. In general, such systems are composed of a baking soda, e.g., sodium, potassium, or ammonium bicarbonate, etc., as a source of carbon dioxide on one hand, and one or more other common baking acids on the other. Suitable baking acids include sodium aluminum phosphate, anhydrous monocalcium phosphate, monocalcium pyrophosphate, and mixtures thereof. The preferred chemical leavening system for use in the present dry mixes includes any baking soda and a mixture of baking acids. The baking acid mixture comprises a first, slow-reacting baking acid selected from the group consisting of monocalcium phosphate and anhydrous sodium aluminum phosphate and dicalcium phosphate, and mixtures thereof, and a second, fast-reacting baking acid selected from the group consisting of monocalcium phosphate monohydrate, sodium acid pyophosphate and mixtures thereof. In the preferred embodiment, the weight ratio of the first baking acid to the second baking acid is about 0.75:1 to 1.25:1.

F. Optional Components

The present dry mixes containing juice vesicle solids can optionally contain a variety of additional ingredients suitable for rendering finished cakes prepared therefrom more organoleptically desirable. Such optional dry mix components include cocoa, egg white solids, salt, coloring agents, flavoring agents, nuts and fruit. If present, such optional components comprise from about 1% to 8% of the dry mixes of the present invention.

Another highly preferred optional ingredient in the present dry mix compositions is dry milk solids. Dry milk solids aid the structuring of the cake foam. If present, such dry milk solids comprise from about 0.5% to 2.0% of the present mixes.

DRY MIX COMPOSITION PREPARATION

The cake mixes of the present invention are prepared by blending the essential and optional components together in such a conventional manner as to produce a free-flowing dry mix. In a preferred method of dry mix preparation, the flour, the sucrose, the shortening, the leavening agent and any optional ingredients are blended in a ribbon blender for a period of about 8-20 minutes at a mix temperature below about 65° F. When a liquid oil is part of the shortening ingredient, then the oil is normally added during blending by means of an oil spray or by extruding the blend mixture through a spreader bar. Blending is continued after introduction of the oil until the oil lump count is from about 10% to 15% by weight on a number 10 U.S. Standard sieve. Best results are obtained when the temperature of the mix after blending is from about 65° to 70° F.

The mix is subsequently finished in a standard commercial finisher. Finishers are devices for reducing shortening lump size and for more intimately incorporating the shortening into a mix by impact mixing. Thus, finishing the mix in a finisher is highly preferred when the shortening component comprises a plastic shortening. Commercially available finishers generally include an exposure on which are mounted rapidly rotating blades. After finishing to insure reduction in lump count, larger sized optional ingredients such as nuts and fruits are then blended into the mix. The present dry mixes are then packaged in a conventional manner in conventionally suitable containers which typically hold specific weights of the dry mix.

DRY MIX COMPOSITION USE

The present dry mixes are conveniently prepared into finished cakes in the conventional manner by forming a batter by mixing the dry mix in a household electric mixer, for example, for two minutes at medium or high speed, after having added water or other aqueous liquid, shortening and eggs or egg whites to the mix. The batter resulting from the mixing process is poured into a cake pan and baked, for example, for 25 to 40 minutes at 350° to 425°.

The following examples are offered to further illustrate but not to limit the invention disclosed herein:

EXAMPLE I

A dry mix for a yellow layer cake is prepared from the following ingredients:

| Ingredients | Amount | Weight % |
| --- | --- | --- |
| Sugar | | |
| Sucrose[1] | 240.3 g. | 44.5% |
| Dextrose | 18.90 | 3.50 |
| Flour[2] | 205.20 | 38.00 |
| Emulsified Plastic | | |
| Shortening[3] | 37.80 | 7.00 |
| Juice Vesicle | | |
| Solids[4] | 10.80 | 2 |
| Leavening | | |
| Sodium Bicarbonate | 3.51 | 0.65 |
| Monocalcium Phosphate | 3.24 | 0.60 |
| Monocalcium Phosphate | | |
| Anhydrous | 1.08 | 0.20 |
| Dry Milk Solids | 10.80 | 2.0 |
| Salt | 4.05 | 0.75 |
| Color | 0.81 | 0.15 |
| Flavor | 8.10 | 1.50 |

| Ingredients | Amount | Weight % |
|---|---|---|
| | 540.00 g. | 100.00% |

[1] A mixture of granular sucrose and microfine sucrose of 50 microns (90% through a U.S. Standard Sieve No. 270). The weight ratio of granular sugar to microcrystalline sucrose is approximately 1:3.
[2] An all purpose flour made from selected soft red winter wheats having a protein content of 8 to 10% by weight.
[3] Having a Solid Fat Index of approximately 22–26% at 70° F. and comprising about 10% by weight of the shortening of a food grade emulsifier comprising a mixture of mono and polyglycerol monoesters of stearic and palmatic acid marketed by Durkee Foods.
[4] Having a moisture content of about 6% by weight of the dried, processed juice vesicle solids. The average particle size is approximately 50 microns.

The above dry mix composition is prepared in the following manner:

Approximately 170 g. of raw juice vesicles having a moisture content of about 95% are fed to a Werner Lahara two foot double cylinder drum drier set at a static gap of 0.5–1.3 mil. The drum drier is operated at a drum surface temperature of about 300°–350° F. by 80–100 p.s.i.g. steam and operated at approximately 1 rpm. The raw juice vesicles are fed to the drum drier at a feed rate of 230 lbs/hr. Upon removal from the drum, the juice vesicle material forms a sheet approximately 4 mil in thickness having a moisture content of about 6%.

The sheet of 6% moisture processed juice vesicle solids is then fed into a granulator or flaker at a feed rate of 25 lbs/hr. Upon exiting the granulator or flaker through a screen having a size opening of a No. 10 U.S. Standard Size Wire, the juice vesicle solids have a particle size distribution as follows:

| Sieve (U.S. Standard) | Weight % |
|---|---|
| On No. 12 | 10% |
| On No. 16 | 40% |
| On No. 20 | 21% |
| On No. 30 | 11% |
| Pan | 18% |

Thereafter, the juice vesicle solids are subjected to a secondary size reduction step as follows. The solids are fed into an Alpine American Corp. alpine-pin Kolloplex mill of 10 hsp at a rate of 6–8 lbs/min. Upon exiting the alpine-pin mill, the juice vesicle solids have a particle size distribution of:

| Sieve (U.S. Standard) | Weight % |
|---|---|
| On No. 100 | 2% |
| On No. 200 | 12% |
| On No. 325 | 23% |
| On No. 400 | 8% |
| Pan | 55% |

The juice vesicle solids material so prepared is then mixed together with the sugar, flour, leavening and optional ingredients in a ribbon blender to form a relatively uniform mixture. Then, the emulsified shortening is blended in the dry mix in the ribbon blender. The dry mix is then fed into a conventional finisher and worked until a sample has an oil lump size of less than 10% on a No. 10 screen, U.S. Standard size. The dry mix is then packaged in a conventional manner.

A cake batter is prepared in conventional manner by mixing the cake mix prepared as described to 3 whole eggs (150 g.), ⅓ cup (75 ml.) of liquid shortening, and 1 cup (240 ml.) of water. The mix and liquid additives are initially mixed in a Hamilton Beach stand mixer at a low speed (approximately 200 rpm) for 30 seconds to moisten the mix. The mixer speed is then increased to a medium setting (approximately 500 rpm) and mixed for two minutes. The batter is then divided equally and poured into two greased 9" round cake pans. The batter is then baked at 350° F. for 30–35 minutes.

The finished cakes so prepared are characterized by enhanced moistness and fine grain structure. When tasted, the finished cake failed to taste gummy.

Cake mixes yielding substantially similar finished cakes are realized when in the Example I composition the processed juice vesicle solids is replaced with an equivalent amount of processed juice vesicle solids having an average particle size of about 100 microns, 150 microns, 200 microns, 300 microns or 400 microns, or mixtures thereof.

EXAMPLE II

A master batch was prepared having the following formulation:

| Basic Formulation - Yellow Cake: | |
|---|---|
| Ingredients | Weight % |
| Sucrose | 46.50% |
| Dextrose | 3.50% |
| Flour[1] | 38.00% |
| Emulsified plastic shortening | 7.00% |
| Sodium bicarbonate | 0.65% |
| Monocalcium phosphate | 0.60% |
| Monocalcium phosphate Anhydrous | 0.20% |
| Salt | 0.75% |
| Color | 0.15% |
| Flavor | 1.50% |

[1] All-purpose flour having an average protein level of 10%.

Six cakes were prepared from the above master blend. The six cakes baked from this mix each had a different material or level of material added. The six variations were: (1) 2% pre-gelatinized waxy maize starch, (2) 2% juice vesicle solids as prepared in Example I, (3) 1% juice vesicle solids, (4) 1% sodium carboxymethyl cellulose, (5) 1.5% pre-gelatinized waxy maize starch and 0.5% sodium carboxymethyl cellulose. A sixth finished cake containing no additives was also prepared to serve as a control.

The various materials tested were uniformly mixed into portions of the master blend dry mix and then the dry mix was blended with water and eggs to form a cake batter for baking. The dry mixes were each mixed with water and eggs in the proportions of 540 grams of dry batter mix, 240 grams water and 3 whole eggs (150 grams) and 72 g. oil (⅓ C.).

After the liquid components were uniformly mixed into each dry mix, the specific gravity of the batters was noted and recorded before baking. Thereafter, each batter was baked for 30 minutes in an oven maintained at 350° F. Upon removal from the oven, each finished cake was allowed to cool 10 minutes in the cake pan and then was removed from the pan and allowed to cool to room temperature.

The volumes of the cakes were then determined by the standard Rapeseed Displacement test. Also, a cut face of the cake layers was examined visually and graded as to crust and grain characteristics using the American Association of Cereal Chemists, "Approved Methods" Sec. 10-91 A.A.C.C., Inc.—7th ed., St. Paul Mn. (1962). The attributes which are used for determining crust score are: color, uniformity, and contour. The grain or internal structure was evaluated on regularity of air cells, lack of tunnels and holes, and the thickness of the cell walls.

The results of such testing are given in Table I below:

TABLE I

| Cake | Batter Appearance | Batter Sp. Gr. | Cake Volume | Cake Crust | Cake Grain |
| --- | --- | --- | --- | --- | --- |
| 2% starch | Started to climb beaters | .84 g./cc. | 1067 cc. | 9 | 7 coarse |
| 2% fr. cells | Normal | .79 g./cc. | 1129 cc. | 9 | 9 |
| 1% fr. cells | Normal | .75 g./cc. | 1140 cc. | 9 | 9 |
| 1% CMC | Started to climb beaters | .80 g./cc. | 1118 cc. | 8 | 7 tunnels |
| Starch & CMC | Thick | .80 g./cc. | 1035 cc. | 9 | 7 tunnels |
| Minus Hydrocolloid | Normal | .77 g./cc. | 1121 cc. | 6 | 7 irregular |

As can be seen from the above Table I, dry mixes of the present invention containing small but effective amounts of processed juice vesicle solids produce finished cakes which exhibit both increased cake volume and a superior grain structure compared to the control. Moreover, the lower specific gravities of the cake batters containing the present processed juice vesicle solids indicate the superiority of aeration of these batters compared to batters prepared from dry mixes containing either carboxymethyl cellulose or pre-gelatinized starch when used at comparable levels.

EXAMPLE III

Tolerance to consumer abuse is the ability of a cake mix to withstand errors or deviations from specified preparation instructions and still to produce an acceptable finished cake.

The present cake mixes containing processed vesicle solids exhibit high tolerance to consumer abuse.

The following master blend was prepared:

| Ingredients | Weight % |
| --- | --- |
| Sucrose | 42.00% |
| Dextrose | 14.00% |
| Flour (All-purpose) | 37.00% |
| Emulsified plastic shortening | 16.00% |
| Sodium bicarbonate | 0.65% |
| Monocalcium phosphate | 0.40% |

-continued

| Ingredients | Weight % |
| --- | --- |
| Sodium Aluminum Phosphate | 0.30% |
| Non-fat dry milk soldis | 1.20% |
| Dried albumen | 0.50% |
| Salt | 0.80% |
| Flavor | 1.50% |
| Color | 0.15% |
| | 98.50% |

The master blend was divided into two halves. To one-half of 1064 g. of master blend was added 16 g. of processed juice vesicle solids as prepared in Example I. To the other half of 1064 g. was added 11 g. of pre-gelatinized starch and 5 g. of sodium carboxymethyl cellulose. Each half was then divided into two portions each of 540 g. The four cake mix portions were then uniformly blended with either a paucity or an excess of water compared to conventional water addition (see Examples I or II) to form cake batters. Additionally, all four cake batters were prepared using an excess of added liquid shortening, specifically, 125 g. of oil and 150 g. of whole eggs and with either 200 g. of water or 280 g. of water were added to the cake mixes. The cake batters were prepared in a manner similar to that described in Example I. The prepared cake batters were then divided equally and poured into two greased 9" round cake pans. The cakes were then baked at 350° F. for 40 minutes.

The results of such testing is given in Table II below:

TABLE II

| Cake | Water | Batter Appearance | Sp.Gr. | Volume | Crust | Grain |
| --- | --- | --- | --- | --- | --- | --- |
| 1. Juice vesicle solids | 200 g. | Normal | .95 g./cc. | 1118 cc. | 9 | 9 |
| 2. Pre-gelatinized starch and carboxymethyl cellulose | 200 g. | Climbed beaters | .95 g./cc. | 1016 cc. | 9 | 6 |
| 3. Juice vesicle solids | 280 g. | Normal | .92 g./cc. | 1041 cc. | 9 | 8 |
| 4. Pre-gelatinized starch and carboxymethyl cellulose | 280 g. | Normal | .97 g./cc. | 867 cc. | Collapsed | |

The cake volume, crust and grain of the finished cakes were graded in a similar manner to that described in Example II. However, no attempt was made to score the fourth finished cake as the cake structure had collapsed. "Collapsed" is used herein to describe the absence of air cells or grain resulting in the cake interior having the appearance of a solid layer.

As can be seen from the above Table II, the cake mixes of the present invention containing processed juice vesicle solids exhibit high tolerance to consumer abuse. Finished cakes of greater cake volume are realized even when the present cake mixes are used with either a paucity or an excess of liquid additions compared to finished cake volumes realized by similar cake mixes containing a mixture of conventional hydrophilic colloids.

When tasted, the finished cakes prepared from the present cake mixes exhibit enhanced moistness yet do not exhibit the gumminess exhibited by those finished cakes prepared from similar cake mixes which contain the various hydrophilic colloids.

EXAMPLE IV

Five cake mixes having the general formula as that given in Example II were prepared with 2% by weight processed juice vesicle solids (6% moisture). The five cake mixes were prepared, tested and evaluated in a similar manner to that described in Example II.

The results of such testing are given in Table III below:

TABLE III

| | Particle Size of Vesicle Solids | Batter Sp.Gr. | Cake Volume | Cake Crust | Cake Grain |
| --- | --- | --- | --- | --- | --- |
| 1. | 53–105 microns | .80 g./cc. | 1085 cc. | 9 | 9 |
| 2. | 105–149 microns | .80 g./cc. | 1150 cc. | 9 | 9 |
| 3. | 149–210 microns | .79 g./cc. | 1120 cc. | 9 | 9 |
| 4. | 210–420 microns | .79 g./cc. | 1120 cc. | 9 | 9 |
| 5. | Greater than 420 microns | .84 g./cc. | 1078 cc. | 9 | 7 (course, irreg. grain) |

As can be seen from examination of the above Table III, cake batters prepared from cake mixes of the present invention containing processed juice-vesicle solids having requisite particle sizes exhibit high aeration as indicated by the relatively low batter density. Such cakes batters generally form finished cakes of high volumes and of excellent cake crust and cake grain attributes. In contrast, cake batters prepared from similar cake mixes but which contain juice vesicle solids having unsuitably large particle sizes fail to exhibit high cake batter aeration as indicated by the relatively high batter density. Importantly, such cake batters yield finished cakes which exhibit relatively poor grain structure.

What is claimed is:

1. A cake mix of a layer-cake type which provides upon baking an enhanced moistness impression cake, comprising:
   A. from about 35% to 45% by weight of said cake mix of wheat flour;
   B. from about 40% to 54% by weight of said dry mix of sugar, said sugar being present in a weight ratio to flour of from about 1.20 to 1.35;
   C. from about 6% to 16% by weight of emulsified shortening; said shortening containing from about 1% to 16% by weight of said shortening of a food grade emulsifier;
   D. from about 0.2% to 10% by weight of processed juice vesicle solids, said processed juice vesicle solids having:
      (1) a moisture content of from about 5% to 12%;
      (2) a particle size of from about 50 to 400 microns; and
   E. from about 0.5% to 4% of a chemical leavening agent.

2. The cake mix of claim 1 wherein the juice vesicle solids have a particle size of less than about 200 microns.

3. The cake mix of claim 2 wherein the juice vesicle solids are derived from orange juice.

4. The cake mix of claim 3 wherein the chemical leavening system comprising a bicarbonate salt and a first baking acid selected from the group consisting of an hydrous sodium aluminum phosphate and monocalcium phosphate, and a second baking acid selected from the group consisting of monocalcium phosphate monohydrate, sodium acid pyrophosphate and mixtures thereof.

5. The cake mix of claim 4 wherein the juice vesicle solids are present at from 0.5% to 5% by weight.

6. The cake mix of claim 5 wherein the juice vesicle solids have a moisture content of about 6% to 8.5% by weight of said juice vesicle solids.

7. The cake mix of claim 6 comprising:
   A. from about 36% to 39% by weight of the cake mix of wheat flour;
   B. from about 45% to 50% by weight of sugar; said sugar being present in a weight ratio to flour of from about 1.27 to 1.34; and
   C. from about 8% to 13% by weight of emulsified shortening.

8. The cake mix of claim 7 wherein the juice vesicle solids have been drum dried at a roll surface temperature of less than about 350° F.

9. The cake mix of claim 8 additionally comprising from about 0.01% to 5% by weight of non-fat dry milk solids.

10. The cake mix of claim 8 wherein the juice vesicle solids are present at from about 1% to 2% by weight.

* * * * *